Patented Sept. 8, 1953

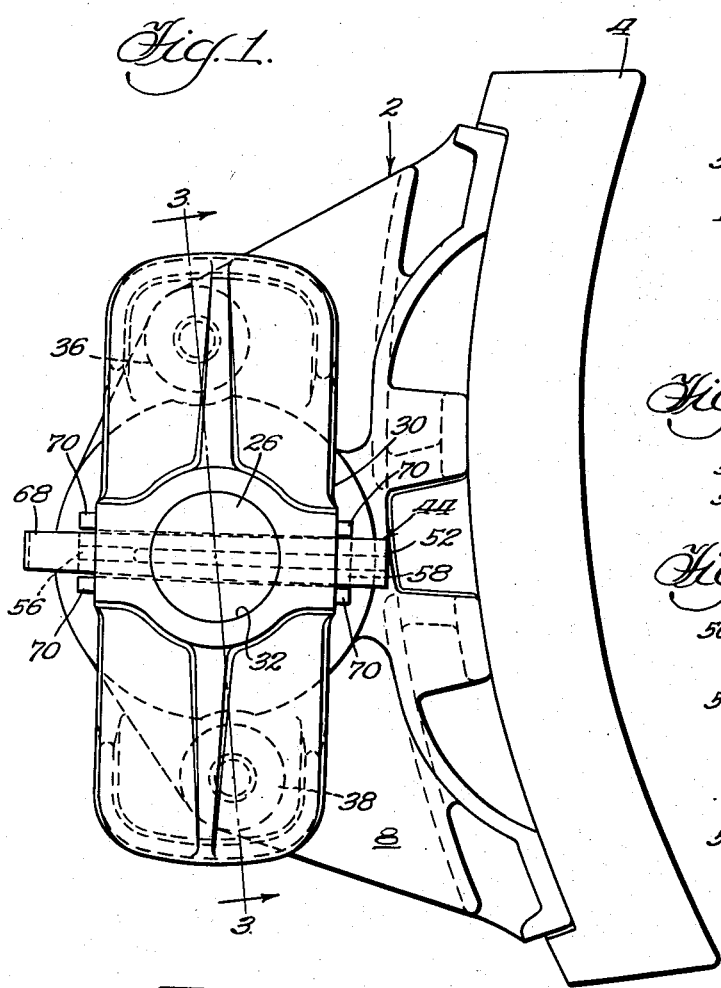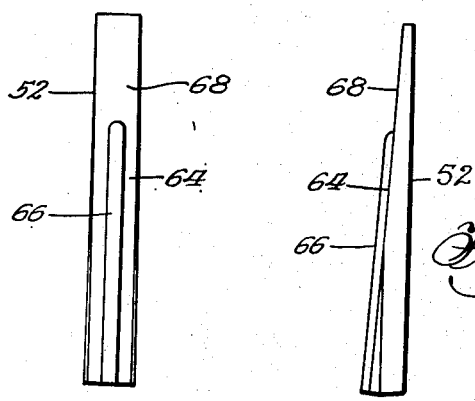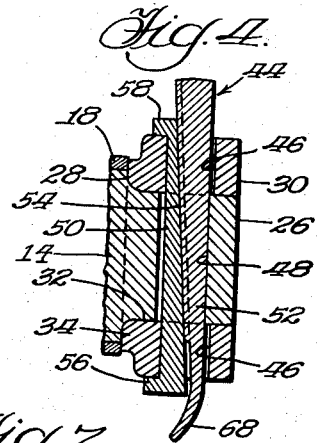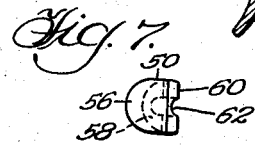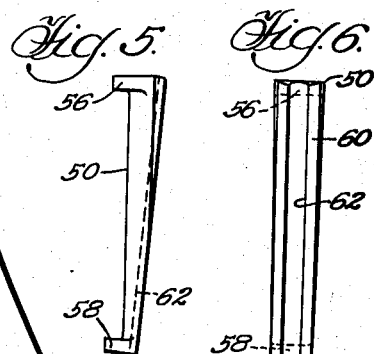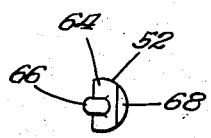

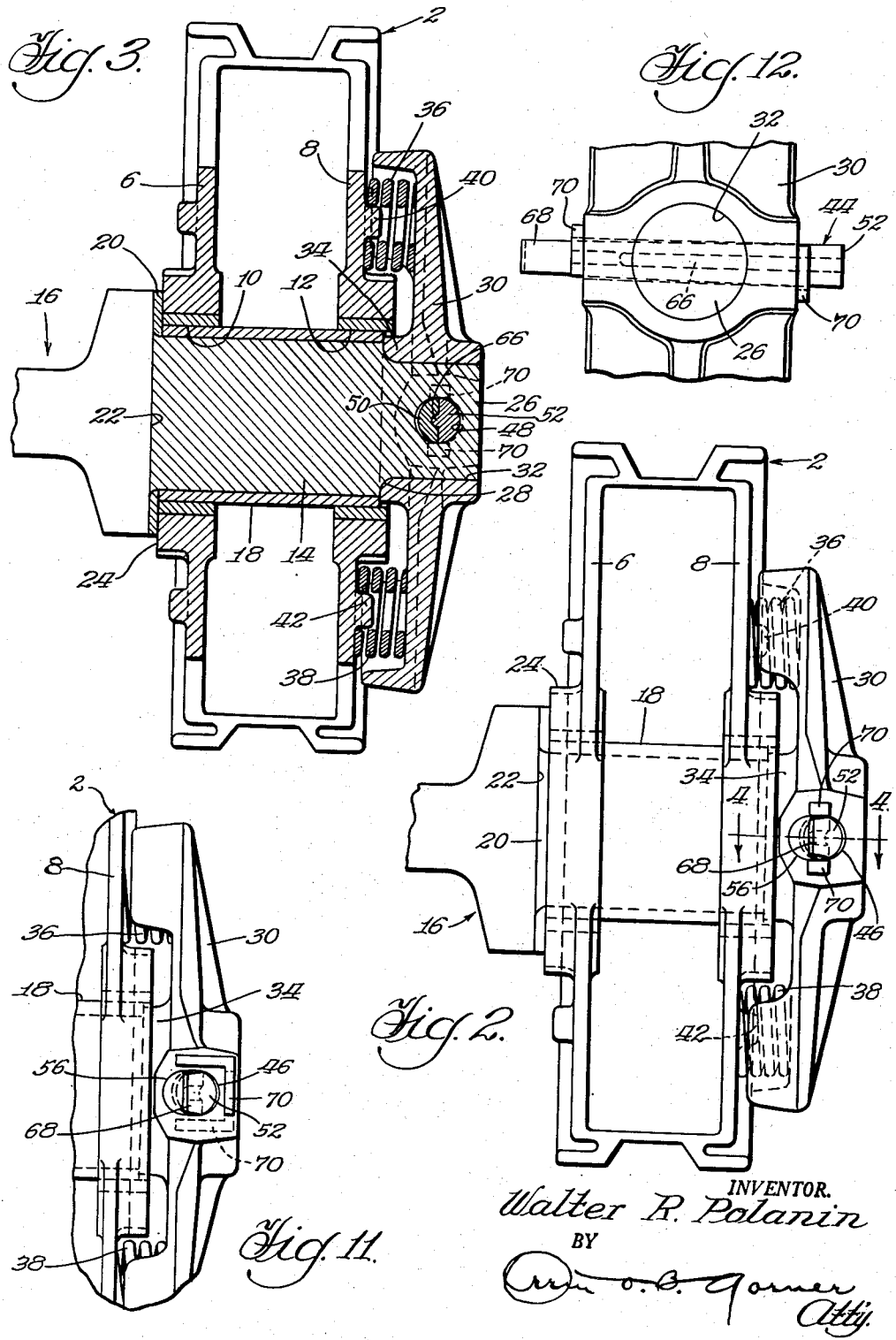

2,651,390

UNITED STATES PATENT OFFICE 2,651,390

BRAKE HEAD ARRANGEMENT

Walter R. Polanin, Chicago, Ill., assignor to American Steel Foundries, Chicago, Ill., a corporation of New Jersey Application April 14, 1950, Serial No. 155,946

8 Claims. (Cl. 188—221.1)

This invention relates to brake head retainers and more particularly to a novel brake head balancing device adapted to frictionally resist rotation of a brake head on its pivot or trunnion.

A primary object of the present invention is to devise a brake head retainer of the above-described type, which may be quickly assembled and disassembled, and which is of economical and rugged construction, capable of withstanding the severe vibrations and impacts of railway brake service.

A more specific object of the invention is to provide a novel wedge key extending through a spring plate and trunnion to compress springs supported by the plate against a brake head pivotally mounted on the trunnion, thereby urging the brake head against a shoulder of the trunnion to frictionally resist rotational movement of the brake head on the trunnion.

A further object of the invention is to wedge the spring plate tightly against a shoulder on the trunnion to positively lock the spring plate against movement due to vibration or due to rotational movement of the brake head on the trunnion.

Another object of the invention is to devise means for positively maintaining the wedge elements of the key in such position that one of the elements reacts against the trunnion along an inboardly facing surface thereof and the other of the elements reacts against the spring plate against an outboardly facing surface thereof, whereby the plate is urged into tight engagement against an outboardly facing surface of the trunnion.

Still another object of the invention is to wedge the spring plate against the outboard extremity of the trunnion bushing which supports the brake head, thereby positively preventing any tendency of the bushing to rotate or creep in an outboard direction.

The foregoing and other objects and advantages of the invention will become apparent from a consideration of the following specification and the accompanying drawings wherein:

Figure 1 is a side elevational view of a brake head assembly embodying the invention;

Figure 2 is a rear elevational view taken from the left of Figure 1;

Figure 3 is a sectional view on the line 3—3 of Figure 1;

Figure 4 is a sectional view on the line 4—4 of Figure 2;

Figures 5 to 10, inclusive, illustrate the detailed construction of the novel retainer key, Figure 5 being a side elevational view of one element or part of said key, Figure 6 being an elevational view thereof from the wedge face thereof, Figure 7 being a plan view thereof, Figure 8 being a side elevational view of the other element or part of the key, Figure 9 being an elevational view from the wedge face thereof, and Figure 10 being a plan view thereof; and Figures 11 and 12 show a modification of the device, Figure 11 being a fragmentary rear elevational view comparable to Figure 2, and Figure 12 being a fragmentary side elevational view comparable to Figure 1.

Describing the invention in detail and referring first to Figures 1 to 3, the novel retainer device is applied to a brake head, generally designated 2, having a brake shoe 4 (Figure 1) secured to the front face thereof in the usual manner. The brake head 2, as best seen in Figures 2 and 3, comprises inboard and outboard walls 6 and 8 having bushed openings 10 and 12 receiving a trunnion 14 of a conventional brake beam, generally designated 16. The trunnion is provided with a bushing 18 and a wear plate 20 at the inboard end thereof, seated against a shoulder 22 of the beam and affording a friction surface for a complementary boss 24 of the inboard brake head wall 6.

The outboard end of the trunnion 14 is provided with axial extension 26, which is preferably of reduced cross-sectional area affording a shoulder 28 at its inboard end. A spring plate 30 is provided with a central opening 32 approximately complementary to and receiving the extension 26, the inboard side of said spring plate being provided with an annulus 34 adapted for tight engagement with the shoulder 28 and the outboard end of the trunnion bushing 18. The spring plate 30 is adapted to compress and afford a slidable seat for top and bottom springs 36 and 38 bearing against and interlocked with spring positioning lugs or bosses 40 and 42, respectively, on the outboard face of the brake head wall 8, whereby as the brake head 2 rotates on the trunnion 14, the springs 36 and 38 are carried therewith and frictionally slide against the spring plate 30. Thus, frictional resistance to rotative movement of the brake head is developed between the wear plate 20 and boss 24 and between the spring plate 30 and the engaged springs 36 and 38.

The springs are compressed and the spring plate 30 is interlocked with the trunnion extension 26 by means of a novel wedge type key generally designated 44. The key 44 extends through aligned openings or apertures 46 in the spring plate 30 and also extends through an aperture 48 in the trunnion extension 26, the latter aperture, as best seen in the sectional view of Figure 4, having its center or axis offset inboardly with respect to that of the substantially co-axial apertures 46, for a purpose hereinafter described. The key 44 comprises an element or shank 50 engaged, as best seen in Figure 4, with the inboard edges or margins of the apertures 46 and spaced from the outboard edges or margins thereof; and the key also comprises an element or shank 52 engaged with the outboard edge or margin of the trunnion aperture 48 and spaced from the inboard edge or margin thereof, the elements being in wedge engagement with each other as at 54 to tightly urge the annulus 34 against the shoulder 28 and bushing 18, as heretofore described.

Referring now to Figures 5 to 10, inclusive, which illustrate in detail the key elements 50 and 52, it will be noted, as shown in Figures 5 to 7, that the key element 50 is generally arcuate in form at one side thereof, corresponding to the inboard edges of the spring plate apertures 46 against which it bears, and the element is provided with heads 56 and 58 at opposite ends thereof projecting from the arcuate side thereof. The other side of the element 50 is formed with a substantially flat wedge face 60 interrupted by a groove 62 extending from end to end of the element 50.

The other key element 52 is shown in detail in Figures 8 to 10, wherein it will be seen that the element 52 is generally arcuate on one side thereof to conform to the shape of the trunnion aperture 48 against which it bears, the other side of the element 52 being formed with a substantially flat wedge face 64 extending from end to end thereof and interrupted by a tongue 66 adapted for reception within the groove 62 when the wedge faces 64 and 60 of the respective elements 52 and 50 are in engagement with each other, as shown at 54 in Figure 4.

Referring again to Figures 8 to 10, it will be seen that the element 52 tapers toward one end thereof to afford a malleable lug or extension 68 adapted to be bent over against the head 56 of the element 50 after the parts have been tightly wedged as by a hammer, to the assembled position of Figure 4.

Each side of the spring plate 30 is provided with spaced top and bottom lugs 70, snugly confining one head 56 or 58 of the key element 50, thereby maintaining the latter against rotation from the position shown in Figures 1 to 4, and positively preventing application of the elements 50 and 52 in any position other than those in which they will wedge, respectively, against the plate 30 and trunnion 14.

Thus, it will be understood that in assembling the novel device, the spring plate 30, by means of a clamp (not shown), is sleeved over the trunnion extension 26, which projects through the opening 32 of the spring plate. Thereafter, the wedge element 50 is inserted through the apertures 46 and 48, the smaller head 58 being inserted first, inasmuch as the large head 56 is incapable of passing through the apertures. After the heads 56 and 58 have been properly related to the lugs 70, as shown in the drawings, the wedge element 52 is inserted and then driven tightly to wedge position shown in Figure 4, as for example, by a hammer applied to the large end thereof. Thereafter, the malleable lug 68 is bent over against the large head 56 of the element 50 to afford a positive interlock preventing loosening of the wedge elements 50 and 52 during the intense vibrations to which the device is subjected in railway service.

Figures 11 and 12 illustrate a modification of the invention wherein L-shaped lugs 70 and 70 are provided at opposite sides of the spring plate 30 at the remote ends of its apertures 46, other parts of the device being identical with those described in connection with the preceding embodiment, and being identified by corresponding numerals.

It may be noted that in the modification of Figures 11 and 12, each lug 70 comprises a leg or segment at the outboard side of the related aperture 46, one of the lugs having a leg or segment overlying its aperture 46 and the other having a leg or segment underlying its aperture 46, thereby positively preventing misapplication of the key element 50. Furthermore, engagement of the heads 56 and 58 with the lugs 70 positively prevents rotational movement of the element 50 from the position shown in the drawings.

It will be understood that in the modification of Figures 11 and 12, the key elements 50 and 52 can only be assembled with the element 50 engaging the inboard edges of the plate apertures 46 and the element 52 engaging the outboard edge of the trunnion aperture 48, inasmuch as the lugs 70 interfere with the heads 56 and 58 of the key element 50 in any other rotational position thereof. In the embodiment of Figures 1 to 4, the key elements 50 and 52 can be reversed with respect to the relative positions shown in the drawings; however, the lugs 70 are formed and arranged to positively maintain one element against the outboard edge of the trunnion aperture 48 and the other element against the inboard edges of the plate apertures 46.

I claim:

1. In a brake rigging, a brake beam including a trunnion and a coaxial extension of smaller diameter than the trunnion, a brake head journaled on said trunnion, a spring plate sleeved on said extension, springs compressed between said plate and said head, and wedge means extending through openings in the plate and extension to maintain said plate in tight abutting engagement against the outboard end of the trunnion.

2. In a brake rigging, a brake beam including a trunnion and a coaxial extension of smaller diameter than the trunnion, a brake head journaled on said trunnion, a spring plate sleeved on said extension, springs compressed between said plate and said head, and wedge means extending through openings in the plate and extension to maintain said plate in tight abutting engagement against the outboard end of the trunnion, and lugs provided on said plate to engage said wedge means against rotational movement within said openings.

3. In a brake rigging, a brake beam including a trunnion, a cylindrical extension projecting from the outboard end of the trunnion, an abutment surface provided at the inboard end of the trunnion, a bushing sleeved over said trunnion, a brake head journaled on said bushing, a spring plate sleeved over said extension, compression springs interposed between said plate and brake head to urge the latter into frictional engagement against said abutment surface, and means acting to urge and maintain said plate in engagement with said trunnion and said bushing to prevent rotational movement of the plate and bushing relative to the brake beam.

4. In a brake rigging, a brake beam including a trunnion, a cylindrical extension projecting from the outboard end of the trunnion, an abutment surface provided at the inboard end of the trunnion, a bushing sleeved over said trunnion, a brake head journaled on said bushing, a spring plate sleeved over said extension, compression springs interposed between said plate and brake head to urge the latter into frictional engagement against said abutment surface, and wedge members extending through openings in the plate and extension to move said plate into tight engagement against the outboard ends of said trunnion and bushing to clamp said bushing between the plate and said abutment surface.

5. In a brake rigging, a brake beam including a trunnion, a cylindrical extension projecting from the outboard end of the trunnion, an abutment surface provided at the inboard end of the trunnion, a bushing sleeved over said trunnion, a brake head journaled on said bushing, a spring plate sleeved over said extension, compression springs interposed between said plate and brake head to urge the latter into frictional engagement against said abutment surface, and wedge members extending through openings in the plate and extension to move said plate into tight engagement against the outboard ends of said trunnion and bushing to clamp said bushing between the plate and said abutment surface, and lugs formed on said plate adjacent said wedge members to prevent rotational movement of the latter within said openings.

6. In a brake rigging, a brake beam trunnion having an inboard shoulder and an outboard shoulder, a relatively small diameter extension projecting from the outboard end of the trunnion and formed integral therewith, a friction washer engaged against said inboard shoulder, a bushing sleeved over said trunnion and engaged at its inboard end against said washer, a spring plate sleeved over said extension and engaged against said outboard shoulder and the adjacent end of said bushing, a brake head journaled on said bushing, compression springs disposed between said plate and brake head to urge the latter against said friction washer, and means to secure said spring plate in tight engagement against said outboard shoulder and bushing.

7. In a brake rigging, a brake beam trunnion having an inboard shoulder and an outboard shoulder, a relatively small diameter extension projecting from the outboard end of the trunnion and formed integral therewith, a friction washer engaged against said inboard shoulder, a bushing sleeved over said trunnion and engaged at its inboard end against said washer, a spring plate sleeved over said extension and engaged against said outboard shoulder and the adjacent end of said bushing, a brake head journaled on said bushing, compression springs disposed between said plate and brake head to urge the latter against said friction washer, and wedge means to secure said spring plate in tight engagement against said outboard shoulder and bushing.

8. In a brake rigging, a brake beam trunnion having an inboard shoulder and an outboard shoulder, a relatively small diameter extension projecting from the outboard end of the trunnion and formed integral therewith, a friction washer engaged against said inboard shoulder, a bushing sleeved over said trunnion and engaged at its inboard end against said washer, a spring plate sleeved over said extension and engaged against said outboard shoulder and the adjacent end of said bushing, a brake head journaled on said bushing, compression springs disposed between said plate and brake head to urge the latter against said friction washer, wedge means to secure said spring plate in tight engagement against said outboard shoulder and bushing, and lugs formed on said plate adjacent said wedge means to prevent rotational movement of the latter about its longitudinal axis.

WALTER R. POLANIN.

References Cited in the file of this patent

UNITED STATES PATENTS

| Number | Name | Date |
|---|---|---|
| 527,296 | Shephard | Oct. 9, 1894 |
| 1,037,091 | Wedge | Aug. 27, 1912 |
| 1,296,042 | Bralove | Mar. 4, 1919 |
| 2,010,531 | Baselt | Aug. 6, 1935 |
| 2,459,776 | Schlegel | Jan. 18, 1949 |
| 2,507,062 | Tack | May 9, 1950 |
| 2,507,063 | Tack et al. | May 9, 1950 |

FOREIGN PATENTS

| Number | Country | Date |
|---|---|---|
| 64,369 | Switzerland | July 17, 1913 |